June 22, 1926.

T. C. WHITEHEAD

VEHICLE WHEEL

Filed Sept. 30, 1925      2 Sheets-Sheet 1

1,589,915

INVENTOR.
THOMAS C. WHITEHEAD
BY
 ATTORNEYS

June 22, 1926.
T. C. WHITEHEAD
VEHICLE WHEEL
Filed Sept. 30, 1925
1,589,915
2 Sheets-Sheet 2
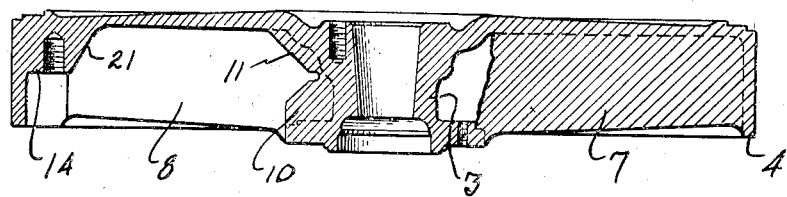
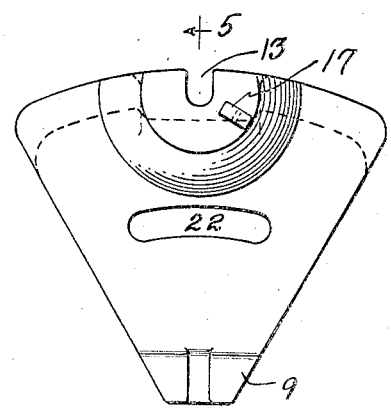
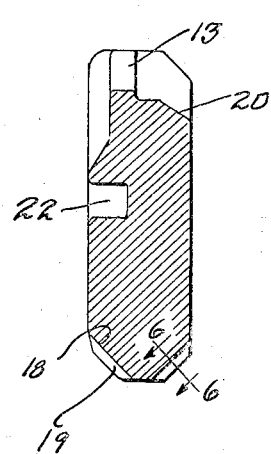
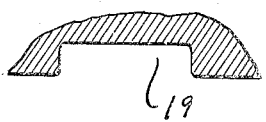
INVENTOR.
THOMAS C. WHITEHEAD
BY
Whittemore Hulbert Whittemore
Belknap ATTORNEYS Patented June 22, 1926.

1,589,915

UNITED STATES PATENT OFFICE.

THOMAS C. WHITEHEAD, OF DETROIT, MICHIGAN.

VEHICLE WHEEL.

Application filed September 30, 1925. Serial No. 59,699.

This invention relates generally to vehicle wheels and refers more particularly to disk wheels having means for carrying a plurality of auxiliary weights for improving their traction.

One of the essential objects of the invention is to provide a wheel of this type in which the disk body thereof is preferably located at one side of the wheel so that the weights may be centralized with respect to the median line of the wheel.

Another object is to provide simple and efficient connections between the weights and the wheel which will permit the weights to be separately attached to or detached from the wheel.

A further object is to provide a weighted wheel having a detachable weighted lateral extension to improve its traction.

With the above and other objects in view the invention consists in certain novel features of construction, combinations and arrangements of parts as will be more fully described and particularly pointed out in the appended claims.

In the accompanying drawings:

Figure 3 is a sectional view taken on the line 3—3 of Figure 2.

Figure 4 is a detail elevation of one of the auxiliary weights.

Figure 5 is a vertical sectional view through the weight shown in Figure 4.

Figure 6 is a fragmentary edge elevation of the weight shown in Figures 4 and 5.

Figure 2:
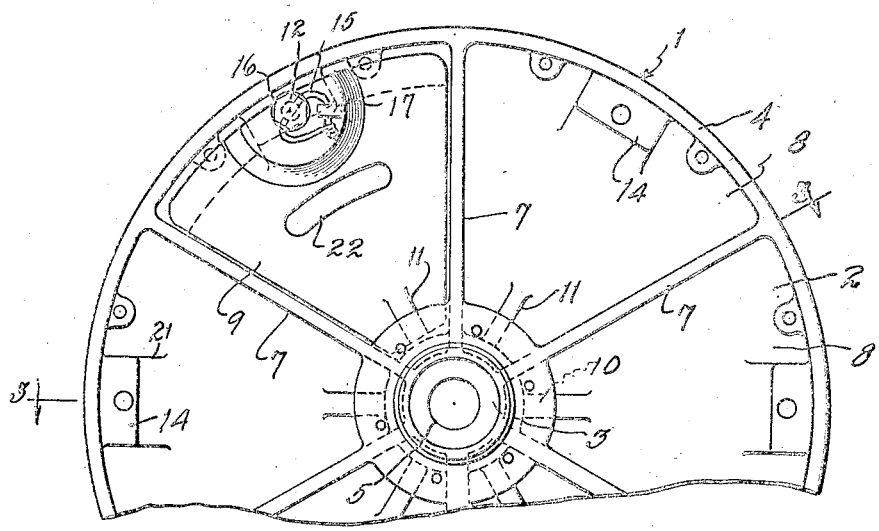
Figure 2 is a fragmentary elevation of the wheel.
Figure 1:
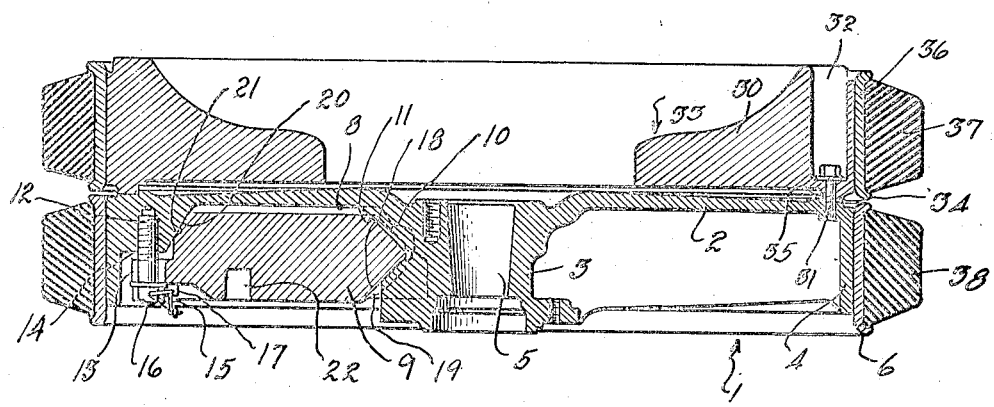
Figure 1 is a sectional view through a wheel embodying my invention with the weights attached thereto.

Referring now to the drawings, the numeral 1 designates a vehicle wheel having a disk body 2 provided at its center with a laterally extending hub portion 3 and provided at its periphery with an annular laterally projecting portion 4. As shown, the hub portion 3 has the usual tapered bore 5, while the annular portion 4 is concentric with the hub 3 and forms a seat for a suitable tire carrying rim 6. In addition, the disk body 2 is preferably provided between the hub 3 and annular portion 4 with a plurality of spaced laterally projecting radially extending ribs 7 which cooperate with the annular portion 4, hub 3 and disk body 2 to form laterally opening pockets 8 for receiving suitable weights 9 for improving the traction of the wheel. As shown, these weights 9 are preferably solid metal castings and are substantially triangular shaped so as to correspond to the general shape of the pockets 8.

To facilitate the attachment of the weights 9 to or the detachment of the weights from the wheel, the hub 3 is provided between the ribs 7 upon opposite sides of the median line of the wheel with radially extending webs 10 having inwardly converging edges 11 which serve as seats to position the pointed ends of the weights 9 when applied to the wheel. Any suitable means such as the bolts 12 may be employed for securing the weights 9 to the wheel. As shown, these bolts extend through suitable open ended slots 13 in the weights at the rounded ends thereof and threadedly engage abutment shoulders 14 projecting laterally inward from the disk body 2 of the wheel. If desired, short wires 15 may be passed through the heads 16 of the bolts and suitable anchorage lugs 17 on the outer faces of the weights to prevent accidental displacement of the bolts. To prevent relative movement between the weights 9 and the wheel, the inclined edges 18 of the weights are preferably provided at the pointed ends thereof with longitudinally extending converging channels 19 which are adapted to receive the webs 11 on the hub 3 when the weights are applied to the wheel. Moreover, the inner faces of the weights are preferably provided adjacent to the rounded ends thereof with inclined shoulders 20 that are engageable with correspondingly inclined bearing faces 21 of the shoulders 14. Thus, with this construction, the weights 9 may be forced snugly into engagement with the hub webs 10 when the bolts 12 are engaged with the shoulders 14 of the disk body of the wheel. As a result, only one securing bolt is required for each weight. Hence the weights may be separately attached to or detached from the wheel without much effort. In view of this a variable number of weights such as 2, 4, or 6 respectively may be used if desired to vary the traction of the wheel.

If desired the outer faces of the weights 9 may be provided with arcuate recesses 22 which constitute finger holds to facilitate the attachment of the weights to or detachment from the wheel. For instance, the fingers of the workman may be placed in these slots 22 when the weights are being lifted into position to engage the webs 10 with the recess 19, or when the weights are being disengaged from the wheel. Inasmuch as the disk body 2 is at one side of the wheel, it is also apparent that the weights 9 may be centralized with respect to the median line of the wheel, hence it will always be balanced properly.

For further improving the traction of the wheel, I preferably provide a relatively wide circular cast iron extension weight 30 which is preferably attached to the disk body 2 of the wheel. In order that relatively short and light bolts 31 will suffice for securing the weighted extension 30 to the wheel, the said extension is preferably provided near its periphery with a series of spaced transversely extending sockets 32 which permit the bolts 31 to engage only relatively thin portions of the extension weight. This weight is also preferably centrally dished upon its outer side as shown at 33 and is provided upon its inner side with an annular flange 34 that seats upon an annular shoulder 35 which takes the weight of the extension and thereby relieves the bolts 31 of any shearing stresses and strains to which they would otherwise be subjected. As shown, the extension weight 30 is preferably equal in diameter to the diameter of the wheel body and is surrounded by a tire carrying rim 36 corresponding to the tire carrying rim 6. Thus the wheel and extension may be equipped with standard tire rims which are interchangeable. Moreover the arrangement is such that the combined tread surface of the tires 37 and 38 will afford the desired traction on hard surfaces or pavements without the necessity of providing double wheel constructions which necessarily are decidedly more expensive to manufacture and do not possess sufficient weight to obtain the proper traction. Furthermore, the laterally spaced tires will tend to prevent the vehicle from skidding and slipping over hard surfaces or pavements.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

1. A vehicle wheel having a disk body and a pocket at one side of said body in the median line of the wheel for receiving an auxiliary weight to improve its traction.

2. A vehicle wheel having a disk body provided with laterally extending concentric hub and rim portions, and radial ribs projecting laterally from said disk body between said hub and rim cooperating with said body, hub and rim to form pockets for receiving auxiliary weights.

3. A vehicle wheel having a hub provided with a positioning web for an auxiliary weight, and a lateral abutment shoulder having an inclined surface for urging the weight toward said positioning web.

4. A vehicle wheel having a hub, and radial webs on the hub upon opposite sides of the median line of the wheel for positioning an auxiliary weight.

5. In combination, a vehicle wheel having a plurality of pockets for receiving auxiliary weights to improve its traction, and weights separately attached to said wheel in said pockets.

6. An auxiliary weight for vehicle wheels including a solid body having a groove for engagement with a positioning lug on a wheel and having a slot for receiving a securing element.

7. An auxiliary weight for vehicle wheels including a solid body having a groove for engagement with a positioning lug on a wheel, and a recess in one side thereof adapted to receive the working man's fingers when the weight is being positioned on said wheel.

8. An auxiliary weight for vehicle wheels including a substantially triangular shaped body having positioning grooves in the inclined side edges thereof and having a bolt receiving slot in one end thereof.

9. In combination, a vehicle wheel having a hub, an auxiliary weight for improving the traction of the wheel, means on the hub for positioning the weight, and means carried by the wheel for forcing said weight into firm engagement with said positioning means.

10. In combination, a vehicle wheel having a laterally opening pocket, an auxiliary weight in the pocket, means for positioning the weight in the pocket, and means cooperating with said positioning means for retaining said weight in said pocket.

11. In combination, a vehicle wheel having a hub, a radially projecting web on the hub, and an annular portion concentric with the hub having an inwardly extending shoulder, a weight seated on said web, and means engageable with the shoulder for retaining the weight seated on said web.

12. In combination, a vehicle wheel having a hub, a radially projecting web on the hub, and an annular portion concentric with the hub having an inwardly extending shoulder, one face of said shoulder being inclined, a weight between the annular portion and hub, and means for forcing one end of said weight against the inclined face of said shoulder to seat the opposite end of said weight firmly against the web on said hub.

13. In combination, a vehicle wheel having a hub, and an annular portion concentric with the hub having an inwardly extending shoulder, a weight between the annular portion and hub, means engageable with the shoulder for securing the weight between the annular portion and hub, and means at one side of the shoulder for urging the weight against the hub when said securing means is adjusted.

In testimony whereof I affix my signature.

THOMAS C. WHITEHEAD.